(12) United States Patent
Liu

(10) Patent No.: US 8,217,743 B2
(45) Date of Patent: Jul. 10, 2012

(54) MAGNETIC LOCKING SYSTEM

(75) Inventor: Jie Liu, Lisle, IL (US)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 12/685,961

(22) Filed: Jan. 12, 2010

(65) Prior Publication Data
US 2010/0237970 A1    Sep. 23, 2010

Related U.S. Application Data

(60) Provisional application No. 61/161,613, filed on Mar. 19, 2009.

(51) Int. Cl.
*H01F 7/02*  (2006.01)
*H01F 7/20*  (2006.01)

(52) U.S. Cl. ........ 335/288; 335/285; 335/286; 335/287; 335/296

(58) Field of Classification Search .......... 335/285–296, 335/303, 306
See application file for complete search history.

(56) References Cited

U.S. PATENT DOCUMENTS

| | | | | |
|---|---|---|---|---|
| 2,209,558 A | * | 7/1940 | Bing et al. ..................... | 335/295 |
| 2,243,616 A | * | 5/1941 | Bing et al. ..................... | 335/295 |
| 2,892,474 A | | 6/1959 | Hiebert | |
| 3,017,545 A | * | 1/1962 | Meier ............................ | 335/295 |
| 3,022,994 A | | 2/1962 | Eklund | |
| 3,316,514 A | * | 4/1967 | Radus et al. .................. | 335/291 |
| 3,578,043 A | | 5/1971 | Menge | |
| 3,703,654 A | | 11/1972 | Karubian | |
| 3,812,629 A | * | 5/1974 | Campbell ...................... | 451/364 |
| 4,055,824 A | * | 10/1977 | Baermann ...................... | 335/288 |
| 4,251,791 A | | 2/1981 | Yanagisawa et al. | |
| 4,314,219 A | | 2/1982 | Haraguchi | |
| 4,329,673 A | | 5/1982 | Uchikune et al. | |
| 4,393,363 A | * | 7/1983 | Iwasaki ......................... | 335/288 |
| 4,934,233 A | | 6/1990 | Brundage et al. | |
| 5,266,914 A | * | 11/1993 | Dickson et al. ............... | 335/288 |

(Continued)

FOREIGN PATENT DOCUMENTS

DE    1 195 881    7/1965

(Continued)

*Primary Examiner* — Mohamad Musleh
(74) *Attorney, Agent, or Firm* — Greer, Burns & Crain, Ltd.

(57) ABSTRACT

Preferred embodiments of the present magnetic locking system can be used for releasably locking a first component to a second component. In one embodiment, the locking system includes a ferro-magnetic member associated with the first component, where the ferro-magnetic member is made of a ferro-magnetic material, and a housing attached to the second component and positioned adjacent to the ferro-magnetic member. Preferably, the housing includes first and second blocks that sandwich an intermediate block. Further, the first and second blocks are each preferably made of a ferro-magnetic material and the intermediate block is made of a non-ferro-magnetic material. Additionally, there is also an aperture formed within the housing, with a permanent magnet rotatably seated within the aperture. The magnetic locking system preferably includes a switch mechanism that is operatively connected to one of the permanent magnet and the housing, wherein the switch mechanism is configured and arranged to rotate the housing and the permanent magnet relative to each other between an "on" position and an "off" position.

11 Claims, 3 Drawing Sheets

U.S. PATENT DOCUMENTS

| | | | |
|---|---|---|---|
| 5,435,613 A * | 7/1995 | Jung | 294/65.5 |
| 5,623,860 A | 4/1997 | Schoene et al. | |
| 6,263,584 B1 * | 7/2001 | Owens | 33/640 |
| 6,707,360 B2 * | 3/2004 | Underwood et al. | 335/288 |
| 7,009,480 B2 * | 3/2006 | Tsui et al. | 335/287 |
| 7,201,090 B2 | 4/2007 | Svetlik et al. | |
| 7,275,470 B2 | 10/2007 | Bettacchini | |
| 7,337,702 B2 | 3/2008 | Parks et al. | |

FOREIGN PATENT DOCUMENTS

| | | |
|---|---|---|
| DE | 40 19 775 | 1/1992 |
| EP | 0 050 303 | 4/1982 |
| EP | 1 570 963 | 9/2005 |
| GB | 2 449 158 | 11/2008 |

* cited by examiner

MAGNETIC LOCKING SYSTEM

The present invention relates generally to a magnetic locking system, and more particularly to a magnetic locking system for selectively locking a first component into a desired position with respect to a second component.

SUMMARY OF THE INVENTION

Preferred embodiments of the present magnetic locking system can be used for releasably locking a first component to a second component. In one embodiment, the locking system includes a ferro-magnetic member associated with the first component, where the ferro-magnetic member is made of a ferro-magnetic material, and a housing attached to the second component and positioned adjacent to the ferro-magnetic member. Preferably, the housing includes first and second blocks that sandwich an intermediate block. Further, the first and second blocks are each preferably made of a ferro-magnetic material and the intermediate block is made of a non-ferro-magnetic material. Additionally, there is also an aperture formed within the housing, with a permanent magnet rotatably seated within the aperture. The magnetic locking system preferably includes a switch mechanism that is operatively connected to one of the permanent magnet and the housing, wherein the switch mechanism is configured and arranged to rotate the housing and the permanent magnet relative to each other between an "on" position and an "off" position, where the "on" position enables the housing to significantly attract the magnetic ferro-material because, when the magnetic field is considered outside of the magnetic housing, the magnetic field defined during the "on" position is much greater than that defined during the "off" position, which "off" position only permits a negligible magnetic field to pass outside of the housing.

In one alternative embodiment, an electromagnet is used in place of the housing and permanent magnet assembly of the other embodiment. In this alternative embodiment, the electromagnet, which is associated with the second component, is wired to a power supply and is activated by a switch. Once activated, the electromagnet exerts a magnetic force on the ferro-magnetic member, which his associated with the first component.

BRIEF DESCRIPTION OF THE SEVERAL VIEWS OF THE DRAWINGS

Preferred embodiments of the present invention are described herein with reference to the drawings wherein.

DETAILED DESCRIPTION OF THE INVENTION

Figure 1:
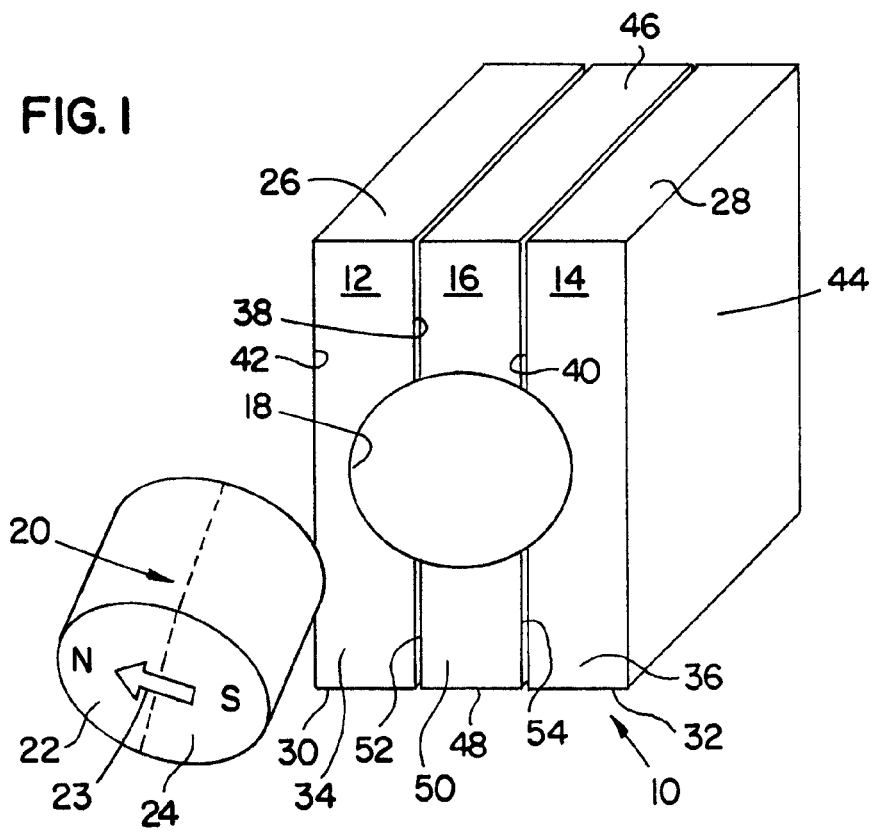
FIG. 1 is a schematic representation of an embodiment of the magnetic lock of the present invention.

Turning now to the drawings, embodiments of the present invention will be described, where FIG. 1 shows one embodiment of a housing 10 of a magnetic lock, which is configured and arranged to have its magnetic force modified between an "on" position, where the housing 10 is attracted to a ferro-magnetic member, such as a steel plate (not shown), and an "off" position, in which the housing 10 is not significantly attracted to the ferro-magnetic member. The ferro-magnetic member may be made of any ferro-material (which is a material that is attracted to a magnet), such as iron, steel, another alloy containing iron, etc.

The housing 10 is preferably made of three blocks 12, 14, and 16, where the first block 12 and the second block 14 sandwich an intermediate block 16. The first block 12 and the second block 14 are made of a ferro-magnetic material, such as iron, and the intermediate block is made of a non-ferro-magnetic material, such as brass or aluminum. Preferably, the same ferro-magnetic material is used for both the first block 12 and the second block 14.

Formed within the housing 10 is an aperture 18, which is preferably round in shape, and which is configured and arranged to accept a permanent magnet 20 therein. As can be seen in FIG. 1, aperture 18 is preferably defined by a portion of the first block 12, a portion of the second block 14 and a portion of the intermediate block 16.

Figure 2:
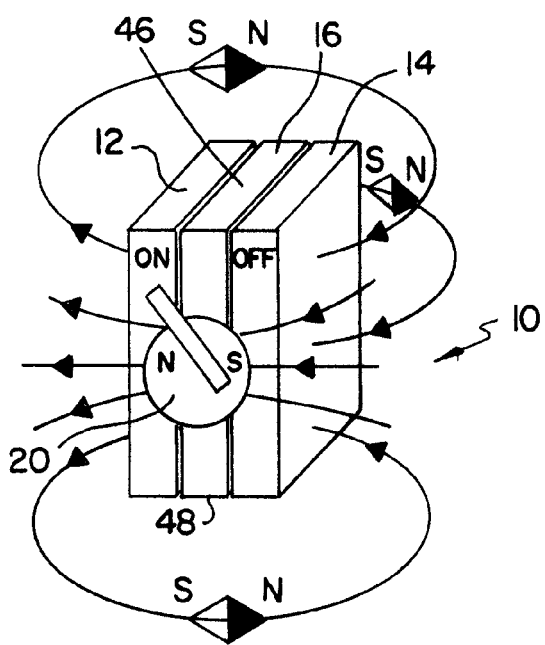
FIG. 2 shows a representation of the magnetic field lines of the magnetic lock of FIG. 1 in the "on" position.
Figure 3:
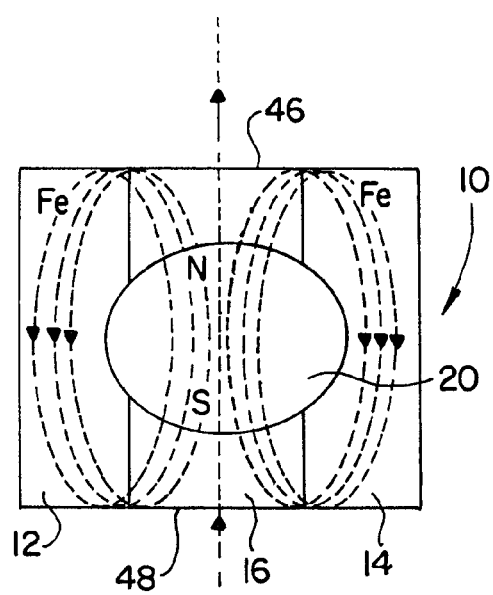
FIG. 3 shows a representation of the magnetic field lines of the magnetic lock of FIG. 1 in the "off" position.

Permanent magnet 20, which includes North and South poles as indicated in FIG. 1 by the letters "N" and "S," and housing 10 are configured and arranged such that permanent magnet 20 can be rotatably seated within the aperture 18. A magnetic direction, represented by arrow 23, of the permanent magnet 20 will be defined as extending from the South pole (S) to the North pole (N) inside the magnet and extending from the North pole (N) to the South pole (S) outside the magnet. The permanent magnet 20 and the housing 10 can be rotated with respect to each other between an "on" position, in which the North and South poles of permanent magnet 20 are positioned with respect to the housing 10 as shown in FIG. 2 (such that the magnetic direction is transverse to the blocks 12, 14 and 16), and an "off" position, in which the North and South poles of permanent magnet 20 are positioned with respect to housing 10 as shown in FIG. 3 (such that the magnetic direction is aligned with blocks 12, 14 and 16, i.e., generally perpendicular to the magnetic direction of the "on" position"). Rotation of one of the permanent magnet 20 and the housing 10 with respect to the other between the "on" position and the "off" position is accomplished through the use of a switch mechanism, an example of which will be described hereinbelow.

In the preferred embodiment, the permanent magnet 20 is preferably formed of a generally cylindrical shape, and the aperture 18 is of a corresponding generally circular shape in cross-section, such as shown in FIG. 1, which permits relative rotation between these two components. Permanent magnet 20 creates a magnetic field, which is represented by the various field lines shown in FIGS. 2 and 3. In the "on" position of FIG. 2, the magnetic field extends generally transverse to the first block 12, the second block 14 and the intermediate block 16. In the "off" position of FIG. 3, the magnetic field extends generally perpendicular to the magnetic field of the "on" position of FIG. 2, and the magnetic field is confined within blocks 12 and 14. Thus, when the magnetic field is considered outside of the housing 10, the magnetic field defined during the "on" position is strong, but the magnetic field defined during the "off" position almost nothing.

More specifically, the permanent magnet 20 is preferably of a generally cylindrical shape, and it is magnetized along its diameter such that it includes a semi-cylindrical North pole section 22 and a semi-cylindrical South pole section 24, as shown in FIG. 1. As also shown in FIG. 1, in this embodiment, the first block 12 and the second block 14 each include an upper surface (26, 28, respectively), a lower surface (30, 32, respectively), a front surface (34, 36, respectively), an inner side surface (38, 40, respectively) facing the intermediate block 16 and an outer side surface (42, 44, respectively) facing away from the intermediate block 16. Additionally, in this embodiment, the intermediate block 16 also includes an upper surface 46, a lower surface 48, a front surface 50, a first side surface 52 facing the first block 12 and a second side surface 54 facing the second block 14. In this embodiment, the "off" position of FIG. 3 results when the permanent magnet 20 is aligned within the aperture 18 such that the North pole faces towards either the upper surface 46 of the intermediate block 16 or towards the lower surface 48 of the intermediate block 16 and the South pole faces toward the other of the upper surface 46 and the lower surface 48 of the intermediate block 16. In contrast, in this embodiment, the "on" position of FIG. 2 occurs when the permanent magnet 20 is rotated relative to the aperture 18 by approximately 90 degrees with respect to the "off" position of FIG. 3.

As can be seen from a review of the magnetic field lines of FIG. 2, when switched to the "on" position, the magnetic field lines show how the magnetic field is essentially passing across and outside of the blocks 12, 14 and 16. Thus, the entire housing 10 acts like a single magnet that can attract a piece of iron or steel or other ferro-magnetic material placed within the magnetic field.

In contrast, when the magnetic locking system is switched to the "off" position of FIG. 3, such as by rotating permanent magnet 20 by approximately 90 degrees with respect to the "on" position shown in FIG. 3, the magnetic field lines show how the magnetic field is essentially maintained within the blocks 12 and 14, with the blocks acting like a magnetic keeper that absorb the majority of the magnetic flux. As a result, there is only a negligible amount of magnetic force acting outside of housing 10. Additionally, such force is not strong enough to noticeably attract a piece of iron or steel or other ferro-magnetic material placed in the vicinity of housing 10.

The magnetic locking system of the present invention can be employed in a variety of different devices to releasably lock a first component to a second component, where the two components are free to move with respect to each other when the system is in the "off" state, but where relative movement between the two components is prevented, or at least severely hindered, when the system is in the "on" state. The magnetic locking system of the present invention can be used to allow either relative rotation or relative linear movement between two components, and then releasably lock the two components into a desired position with respect to each other. In use, a plate made of steel (or other ferro-magnetic material) can be attached to the first component, and the housing 10 can be attached to the second component. Alternatively, if the first component is made of iron, steel or other ferro-magnetic material, there is no need for a separate steel plate because the housing 10 will be magnetically attracted to the material of the first component when the system is in the "on" state. The housing 10 and permanent magnet 20 can be replaced by an electro-magnet with an appropriate circuit (power source, wiring, and switch) if desired.

Examples of the types of devices in which the present magnetic locking system can be employed include household and commercial power tools, furniture (such as swivel chairs), toys, kitchen devices (such as lazy susans), etc. As one example, the present magnetic locking system can be used in a compound miter saw (such as saw 70 of FIG. 4), as either a means for locking the table into position or for locking the saw at the desired bevel angle. More specifically, when used as a bevel locking device, a ferro-magnetic member could be attached to an arm (such as arm 78 of FIG. 4) that is rigidly attached to a table of a miter saw and the housing 10 could be affixed to a bevel post (such as post 80 of FIG. 4) of a saw assembly of the miter saw, where rotation of the bevel post with respect to the arm angles the saw assembly with respect to the table to enable the saw to be used for making bevel cuts. Alternatively, the components of the magnetic locking system could be reversed, such that the housing could be attached to the arm and the ferro-magnetic member attached to the bevel post.

Figure 4:
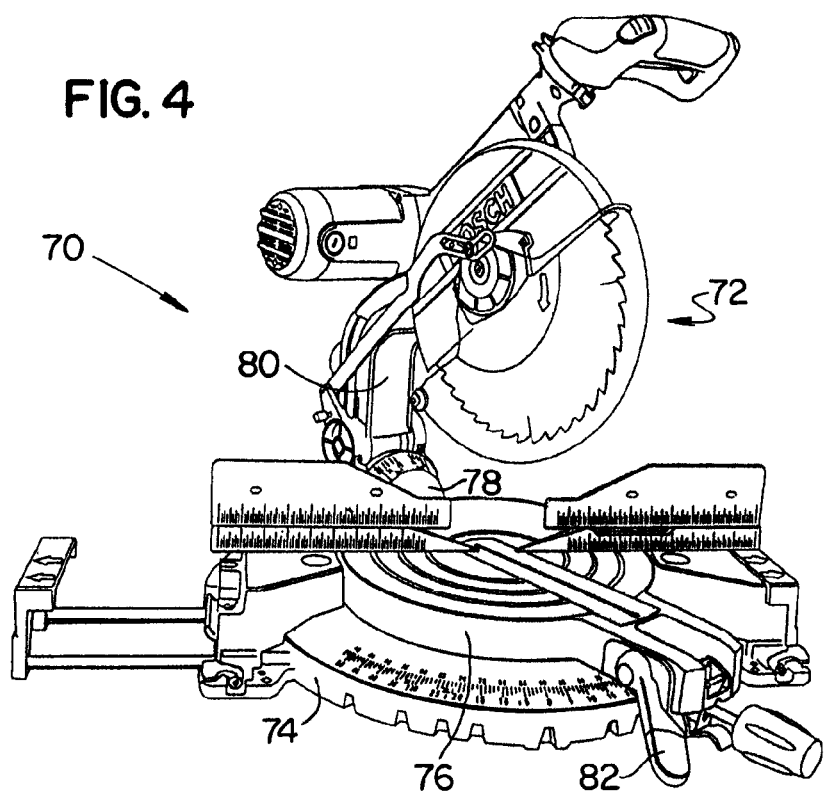
FIG. 4 shows an example embodiment of a compound miter saw, which is one type of device within which the present magnetic lock may be employed.

Additionally, another example of an embodiment of the present magnetic locking device employed for use as a miter locking system in a miter saw will be described next, while referring to FIGS. 4-7. FIG. 4 shows one example of a miter saw 70 that includes a saw assembly 72, a base 74, a table 76, an arm 78 attached to the table 76 and a bevel post 80 that allows the saw assembly 72 to be angled with respect to the table and base to perform bevel cuts. In miter saw 70, table 76 is configured to be able to rotate with respect to base 74, and the magnetic locking system is utilized to lock the table 76 into a locked position with respect to the base 74.

Figure 5:
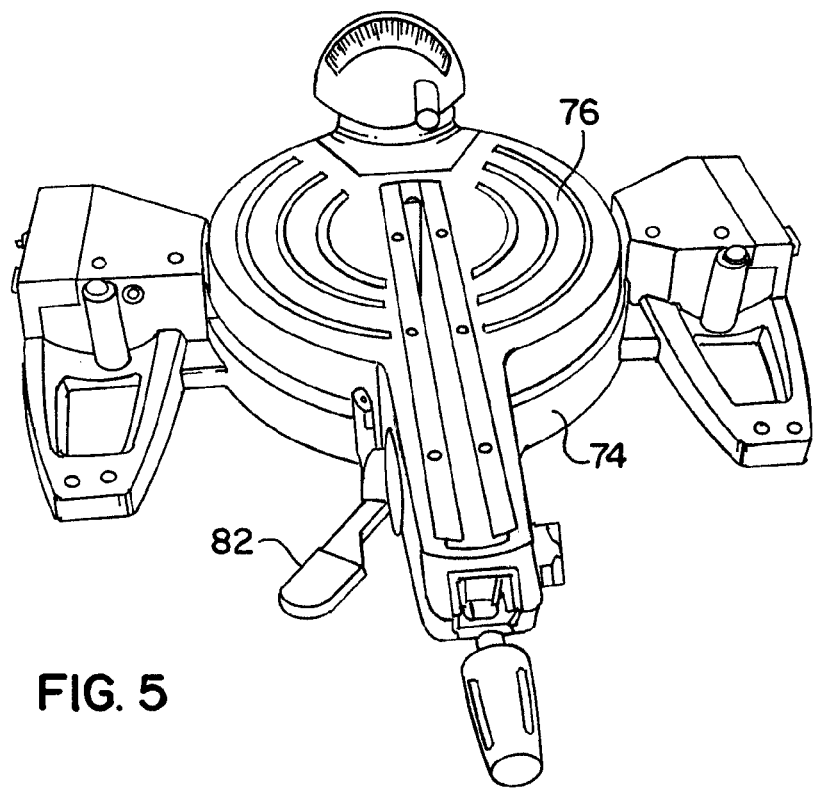
FIG. 5 is a top view of the table and base of a compound miter saw similar to that shown in FIG. 4.
Figure 6:
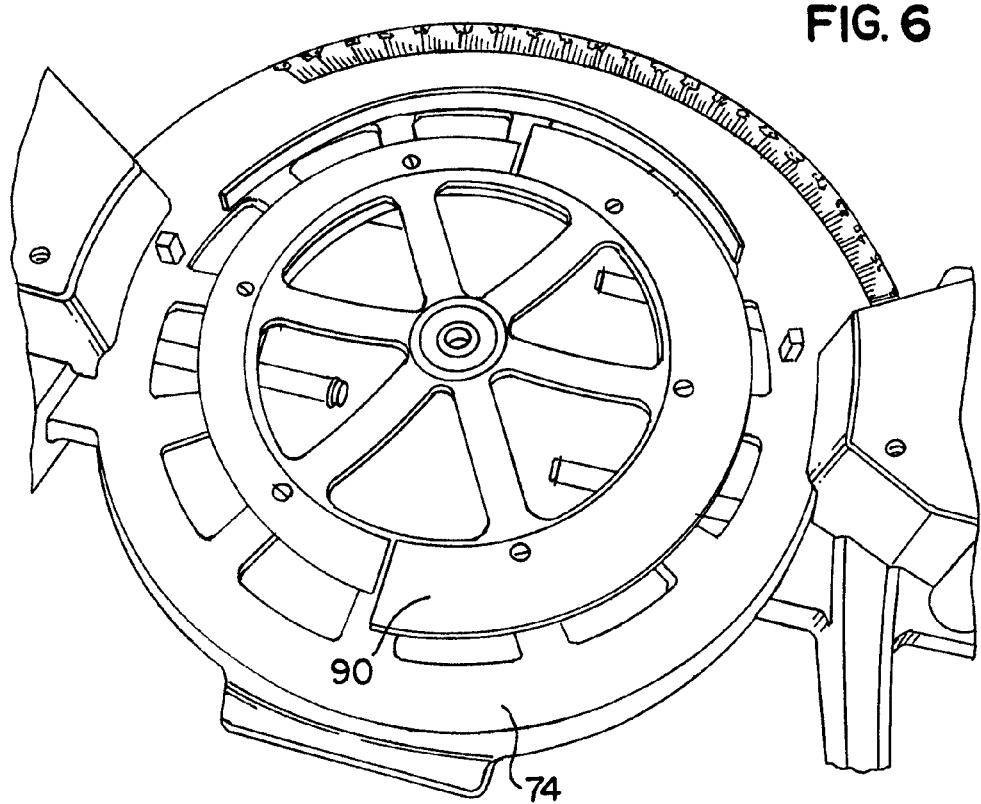
FIG. 6 is a top view of the base portion of the compound saw shown with the table removed.
Figure 7:
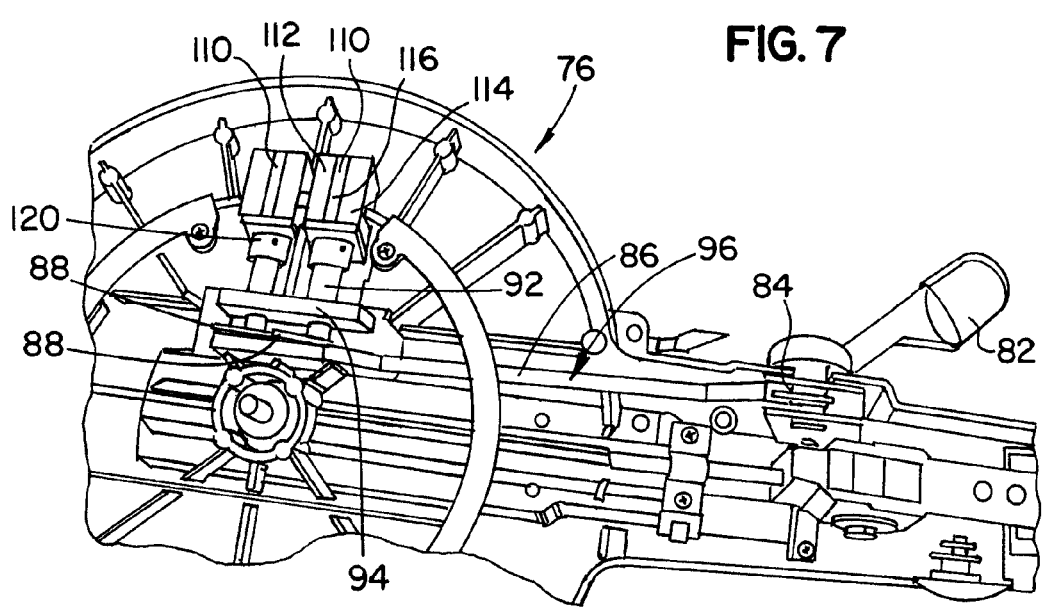
FIG. 7 is a bottom view of the table portion of the compound saw shown without the base.

Turning now to FIGS. 5-7, the base 74 and the table 76 of the miter saw 70 are shown in FIG. 5 without the saw assembly; FIG. 6 shows a view of the upper side of the base 74 without the other components of the miter saw; and FIG. 7 shows an underside view of the table 76 without any other components.

In this embodiment, a pair of magnetic locking systems are used, with each system including a housings 110 (FIG. 7) on the table 76, a ferro-magnetic material in the form of a steel plate 90 on the underside of base 74 (FIG. 6). This embodiment also includes a linkage assembly 96 (FIG. 7) that is configured to switch the magnetic locking systems between the "on" and "off" positions via manipulation of handle 82. It should be noted that two or more housings may be used together to increase the magnetic locking force, such as demonstrated by the use of two housings 110 in this embodiment.

Turning now to FIG. 7, the details of this embodiment will be explained. The housings 110 are each configured in the same manner as housing 10 of FIG. 1. More specifically, each housing 110 includes a first block 112, a second block 114 and an intermediate block 116 positioned between the first and second blocks. Additionally, each housing 110 also includes a permanent magnet 120 that is seated for rotation within an aperture defined within all three blocks 112, 114, 116.

As described above with respect to FIGS. 1-3, when the permanent magnet (20, 120) is rotated within housing (10, 110) to be at the "on" position of FIG. 2, the magnetic flux extends in the transverse direction to create a larger magnet formed by the combination of the three blocks (12/112, 14/114, and 16/116). Accordingly, housings 110 will be attracted to steel plate 90 (FIG. 6), and will lock the table 76 into a desired position with respect to the base 74.

In contrast, when permanent magnet (20, 120) is rotated within housing (10, 110) to be at the "off" position of FIG. 3, the magnetic flux is essentially maintained within the housing (10, 110), and the housings 110 are not attracted to steel plate 90 (FIG. 6). Accordingly, the table 76 is free to be rotated with respect to base 74.

Next, a description will be provided of some details of linkage assembly 96, which is one method of rotating the permanent magnets 120 within the housings 110. As can be seen in FIG. 7, the linkage assembly 96 includes a handle 82 that is operatively attached to a cam 84, which converts the rotary motion of handle 82 into linear motion that moves actuation beam 86 linearly along its longitudinal axis. The other end of actuation beam 86 is attached to a pair of eccentric disks 88, and each eccentric disks 88 is attached to an axial extension 92 of permanent magnet 120. Each axial extension 92 passes through an aperture in yoke 94, where the apertures provide enough clearance to allow the extensions 92 to rotate within the apertures. This combination of eccentric disk 88, axial extensions 92 and yoke 94 converts the linear motion of actuation beam 86 back into rotary motion to rotate the permanent magnets 120 within housings 110 between the "on" and "off" positions when handle 82 is manipulated.

Of course, other configurations for switching between the "on" and "off" positions besides the example just described are also contemplated as being within the scope of the invention. Additionally, while this embodiment included means for rotating the permanent magnetic within the housing, it is also contemplated that the housing can be rotated while the permanent magnet remains stationary, or that both the magnet and housing could both be rotated by about 45 degrees, as long as there is relative rotation between the magnet and the housing, and the rotation changes the direction of the magnetic flux between the "on" and "off" positions as described above.

However, if an electromagnet is used in place of housing/permanent magnet combination, there is no need for a mechanism to rotate a magnet within a housing. Instead, the electromagnet is merely connected to a power source via a switch. When the electromagnet is activated by the switch, the magnetic force attracts the ferro-magnetic member (such as steel plate 90, of FIG. 6). On the other hand, when the electromagnet is turned off, there is no magnetic attraction between it and the ferromagnetic member (such as plate 90), and the first and second components (such as base 74 and table 76) are free to rotate relative to each other.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended example claims.

What is claimed is:

1. A miter saw comprising:
  a magnetic locking system for releasably locking a first component to a second component, wherein said first component is a base of a miter saw, said second component is a miter saw table, and said miter saw table is configured and arranged to rotate with respect to said base;
  wherein said locking system includes:
    a ferro-magnetic member associated with the first component;
    a magnet housing attached to the second component and positioned adjacent said ferro-magnetic member, wherein said magnet housing includes first and second blocks that sandwich an intermediate block, and further wherein said first and second blocks are each made of a ferro-magnetic material and said intermediate block is made of a non-ferro-magnetic material;
    an aperture formed within said housing;
    a permanent magnet rotatably seated within said aperture;
    a switch mechanism operatively connected to one of said permanent magnet and said housing, wherein said switch mechanism is configured and arranged to rotate said housing and said permanent magnet relative to each other between an on position and an off position.

2. The miter saw according to claim 1, wherein said aperture is defined by a portion of said first block, a portion of said second block and a portion of said intermediate block.

3. The miter saw according to claim 1, wherein:
  said permanent magnet is of a generally cylindrical shape and creates a magnetic field;
  said on position is defined when said permanent magnet is positioned within said aperture such that said magnetic field extends generally transverse to said first block, said second block and said intermediate block; and
  said off position is defined when said permanent magnetic is positioned within said aperture such that said magnetic field extends generally perpendicular to said magnetic field of said on position,
  whereby, when considered outside of said housing, said magnetic field defined during said on position is much greater than that defined during said off position.

4. The miter saw according to claim 1, wherein:
  said permanent magnet includes a north pole section and a south pole section, whereby a magnetic direction extends from said south pole to said north pole;
  said on position is defined when said magnetic direction is transverse to said first, second and intermediate blocks; and
  said off position is defined when said magnetic direction is aligned with said first, second and intermediate blocks, whereby said magnetic direction during said on position is generally perpendicular to said magnetic direction during said off position.

5. The miter saw according to claim 1, wherein:
  said permanent magnet is of a generally cylindrical shape and is magnetized along its diameter such that said permanent magnet includes a semi-cylindrical north pole section and a semi-cylindrical south pole section;
  said first block and said second block each include an upper surface, a lower surface, a front surface, an inner side surface facing said intermediate block and an outer side surface facing away from said intermediate block;
  said intermediate block includes an upper surface, a lower surface, a front surface, a first side surface facing said first block and a second side surface facing said second block;
  said off position occurs when said permanent magnet is aligned within said aperture such that said north pole faces towards one of said upper surface of said intermediate block or said lower surface of said intermediate block and said south pole faces toward the other of said upper and lower surfaces of said intermediate block; and
  said on position occurs when said permanent magnet is rotated relative to said aperture by approximately 90 with respect to said off position.

6. The miter saw according to claim 1, wherein said first block and said second block are made of the same ferromagnetic material.

7. The miter saw according to claim 1, wherein said first and second blocks are made of iron, and said intermediate block is made of aluminum.

8. The miter saw according to claim 1, wherein said first and second blocks are made of iron, and said intermediate block is made of brass, 9. The miter saw according to claim 1, wherein said ferro-magnetic member is a plate made from a material including iron.

10. A miter saw comprising:
a magnetic locking system for releasably locking a first component to a second component, wherein said first component is a base of a miter saw, said second component is a miter saw table, and said miter saw table is configured and arranged to rotate with respect to said base;
wherein said locking system includes:
a ferro-magnetic member associated with the first component;
a magnet housing attached to the second component and positioned adjacent said ferro-magnetic member, wherein said magnet housing includes first and second blocks that sandwich an intermediate block, and further wherein said first and second blocks are each made of a ferro-magnetic material and said intermediate block is made of a non-ferro-magnetic material;
an aperture formed within said housing;
a permanent magnet rotatably seated within said aperture;
a switch mechanism operatively connected to one of said permanent magnet and said housing, wherein said switch mechanism is configured and arranged to rotate said housing and said permanent magnet relative to each other between an on position and an off position,
wherein said ferro-magnetic member is a plate affixed to an upper surface of said base;
wherein said ferro-magnetic housing is affixed to a lower surface of said table; and
wherein said switch mechanism includes a cam and an actuation beam that cooperate with each other to rotate said permanent magnet within said aperture.

11. A miter saw comprising:
a magnetic locking system for releasably locking a first component to a second component, wherein said first component is a base of a miter saw, said second component is a miter saw table, and said miter saw table is configured and arranged to rotate with respect to said base;
wherein said locking system includes:
a ferro-magnetic member associated with the first component;
a magnet housing attached to the second component and positioned adjacent said ferro-magnetic member, wherein said magnet housing includes first and second blocks that sandwich an intermediate block, and further wherein said first and second blocks are each made of a ferro-magnetic material and said intermediate block is made of a non-ferro-magnetic material:,
an aperture formed within said housing;
a permanent magnet rotatably seated within said aperture;
a switch mechanism operatively connected to one of said permanent magnet and said housing, wherein said switch mechanism is configured and arranged to rotate said housing and said permanent magnet relative to each other between an on position and an off position,
wherein said first component is an arm rigidly attached to a table of a miter saw; and
wherein said second component is a bevel post attached to a saw assembly of a miter saw, wherein rotation of said bevel post with respect to said arm angles the saw assembly with respect to the table in order to enable bevel cuts.

* * * * *